(12) United States Patent
Cauley

(10) Patent No.: US 6,279,979 B1
(45) Date of Patent: Aug. 28, 2001

(54) SUPPLEMENTARY VEHICLE TAILGATE SUPPORT AND RELATED METHOD

(76) Inventor: Glenn Cauley, 2324 Homestead Duquesne Rd., West Mifflin, PA (US) 15122

( * ) Notice: Subject to any disclaimer, the term of this patent is extended or adjusted under 35 U.S.C. 154(b) by 0 days.

(21) Appl. No.: 09/519,286

(22) Filed: Mar. 6, 2000

Related U.S. Application Data

(63) Continuation-in-part of application No. 09/449,451, filed on Nov. 17, 1999, now abandoned.

(51) Int. Cl.[7] .............................. B62D 25/00; B60J 5/10; E05C 17/02
(52) U.S. Cl. .................. 296/57.1; 296/106; 296/146.8; 292/262; 292/338
(58) Field of Search ............................ 296/57.1, 106, 296/146.8, 58, 59, 60; 292/DIG. 29, 338, 262, 278, 263, 339

(56) References Cited

U.S. PATENT DOCUMENTS

| | | | | |
|---|---|---|---|---|
| 535,442 | * | 3/1895 | Clark | 296/60 |
| 660,479 | * | 10/1900 | Wright | 296/57.1 |
| 2,204,697 | * | 6/1940 | Renno et al. | 296/57.1 |
| 2,955,863 | * | 10/1960 | Olender | 296/57.1 |
| 3,009,732 | * | 11/1961 | Brown | 296/57.1 |
| 4,143,904 | * | 3/1979 | Cooper et al. | 296/57 A |
| 4,307,907 | * | 12/1981 | Barrowman et al. | 292/339 |
| 4,593,946 | * | 6/1986 | Rich | 292/339 |
| 4,601,485 | * | 7/1986 | Furchak | 296/57.1 |
| 4,691,956 | * | 9/1987 | Hodge | 296/51 |
| 4,981,320 | * | 1/1991 | Bowman | 296/57.1 |
| 5,052,729 | * | 10/1991 | Huber | 292/162 |
| 5,280,986 | * | 1/1994 | Friesen et al. | 296/57.1 |
| 5,645,310 | * | 7/1997 | McLaughlin | 296/57.1 |
| 5,707,095 | * | 1/1998 | Pribak et al. | 296/57.1 |
| 5,816,638 | * | 10/1998 | Pool, III | 296/26.11 |
| 5,857,724 | * | 1/1999 | Jarman | 296/26 |
| 5,868,449 | * | 2/1999 | Hitchcock | 296/57.1 |
| 5,947,540 | * | 9/1999 | Pariseau et al. | 296/57.1 |
| 5,971,464 | * | 10/1999 | Davis et al. | 296/57.1 |
| 5,992,909 | * | 11/1999 | Vindum | 292/339 |
| 6,017,067 | * | 1/2000 | Yoneyama et al. | 292/216 |
| 6,053,545 | * | 4/2000 | Asmundson et al. | 292/210 |

FOREIGN PATENT DOCUMENTS

2830819 * 1/1980 (DE) ................................ 296/57.1

* cited by examiner

Primary Examiner—Stephen T. Gordon
Assistant Examiner—Hilary Gutman
(74) Attorney, Agent, or Firm—Arnold B. Silverman; Eckert Seamans Cherin & Mellott, LLC

(57) ABSTRACT

A vehicle has a vehicle body with a tailgate rotatably secured to the vehicle body for rotation about a generally horizontal axis between a closed generally vertical position and an open generally horizontal position. A pair of relatively spaced first support members are secured to the vehicle body and the tailgate for supporting the tailgate in the open position. Two pairs of latches, each having a first latch element secured to the vehicle body and a second latch element secured to the tailgate, cooperate to have each first latch element engage the second latch element when the tailgate is in the closed position. A pair of removable elongated supplementary tailgate supports each have one portion removably secured to the first latch element and a second portion removably secured to the second latch element when the tailgate is in the open position. The supplementary tailgate supports are preferably substantially rigid and may be made of metal. In one embodiment, the first vehicle latch elements are secured to the vehicle body will project inwardly and have corresponding openings in the vehicle support member through which the latch pins pass and will have second vehicle latching elements secured to the ends of the tailgate and projecting outwardly with slots which receive an outwardly projecting pin positioned at the other end of the supplementary support member. A related method of use is also disclosed.

16 Claims, 7 Drawing Sheets

SUPPLEMENTARY VEHICLE TAILGATE SUPPORT AND RELATED METHOD

CROSS REFERENCE TO RELATED APPLICATION

The present application is a Continuation-in-Part of U.S. patent application Ser. No. 09/449,451 filed Nov. 17, 1999.

BACKGROUND OF THE INVENTION

1. Field of the Invention

The present invention relates to removable vehicle tailgate supplementary supports and the method of using the same and, more specifically, it relates to such supports which function to enhance the load-bearing capability of an open generally horizontally disposed vehicle tailgate above and beyond the load-bearing capability existing in the vehicle.

2. Description of the Prior Art

It has been known with a wide variety of vehicles, such as pickup trucks, sport utility vehicles, station wagons to provide, generally at the rear of the vehicle, rotatable tailgate members which can assume a latched closed upper position in which the tailgate is generally vertically oriented and an open or lower position to which the tailgate may be rotated, which is generally horizontal. In the open position, access is obtained to a rear portion of the vehicle interior for loading or unloading items or permitting entry or exit by humans and animals.

Such tailgates generally are provided with a pair of cable members secured to opposite ends of the tailgate and to the vehicle to provide adequate support to the tailgate to resist it going below the horizontal level under many loading conditions. There are, however, many instances wherein such flexible cables do not have adequate strength, such as when heavy equipment or property plus individuals provide a static load on the tailgate greater than the load bearing capability of the cables.

There remains, therefore, a need for supplementary supports which can serve to enhance the load-bearing capability of the tailgate on an as needed basis through removable additional supports.

SUMMARY OF THE INVENTION

The present invention has met the above-described need by providing apparatus and an associated method which will simply, economically and effectively permit large loads to be supported by the open tailgate in a safe manner.

A vehicle of the present invention has a vehicle body which with a rotatable tailgate which is generally rotatable about a horizontal axis between a generally vertical latched closed position and a generally horizontal open position which permits access to the vehicle interior. A pair of relatively spaced first support members which may be permanently installed cable members provide the permanent support to the open tailgate.

A pair of latches each have one latch element secured to the vehicle body and a cooperating second element secured to the tailgate such that when the tailgate is in the closed position, the two latch elements are engaged to retain the same in that position.

A pair of removable elongated supplementary tailgate support members have a first end portion in engagement with the latch elements secured to the vehicle body and a second end portion in engagement with the cooperating latch elements which are secured to the ends of the tailgates. In this manner, the supplementary support members serve to provide additional load-bearing capacity to the open tailgate. It is preferred that the supplementary support members be substantially rigid and durable and that they preferably be made of a suitable metal, such as steel.

A method of the present invention involves positioning the tailgate in at least partially open position, engaging one pair of ends of the supplementary support members to first latching elements and engaging the other end portions of the supplementary support members with thither latching elements thereby establishing additional load-bearing capabilities for the open tailgate.

It is an object of the present invention to provide supplementary support members for use with a vehicle tailgate which support members can be easily secured to the vehicle and tailgate and removed therefrom.

It is another object of the present invention to provide such supplementary support members which substantially enhance the load-bearing capability of the open tailgate and may be readily used by untrained people.

It is yet another object of the present invention to provide such supplementary support members which are of relatively small size so as to facilitate convenient storage and use.

It is yet another object of the present invention to provide such supplementary support members which are adapted to have their respective end portions secured to the latch members of the vehicle and tailgate.

It is yet another object of the present invention to provide such support means which may be removably employed without requiring permanent installation in the vehicle or alteration of the vehicle.

It is a further object of the present invention to provide a method of establishing supplementary support for open tailgates of a vehicle.

These and other objects of the invention will be more fully understood from the following description of the invention on reference to the illustrations appended hereto.

DESCRIPTION OF THE PREFERRED EMBODIMENTS

As employed herein, the term "vehicle" shall include pickup trucks, sport utility vehicles, station wagons, and other power driven vehicles having a tailgate which is normally in the generally vertical or upward closed position, but can rotate downwardly to a generally horizontal position for access to the interior of the rear of the vehicle such as in loading, or unloading, or permitting people or animals to enter or exit.

As employed herein, the term "vehicle body" shall refer broadly to conventional vehicle body parts, frame members and other portions not including the tailgate.

Figure 1:
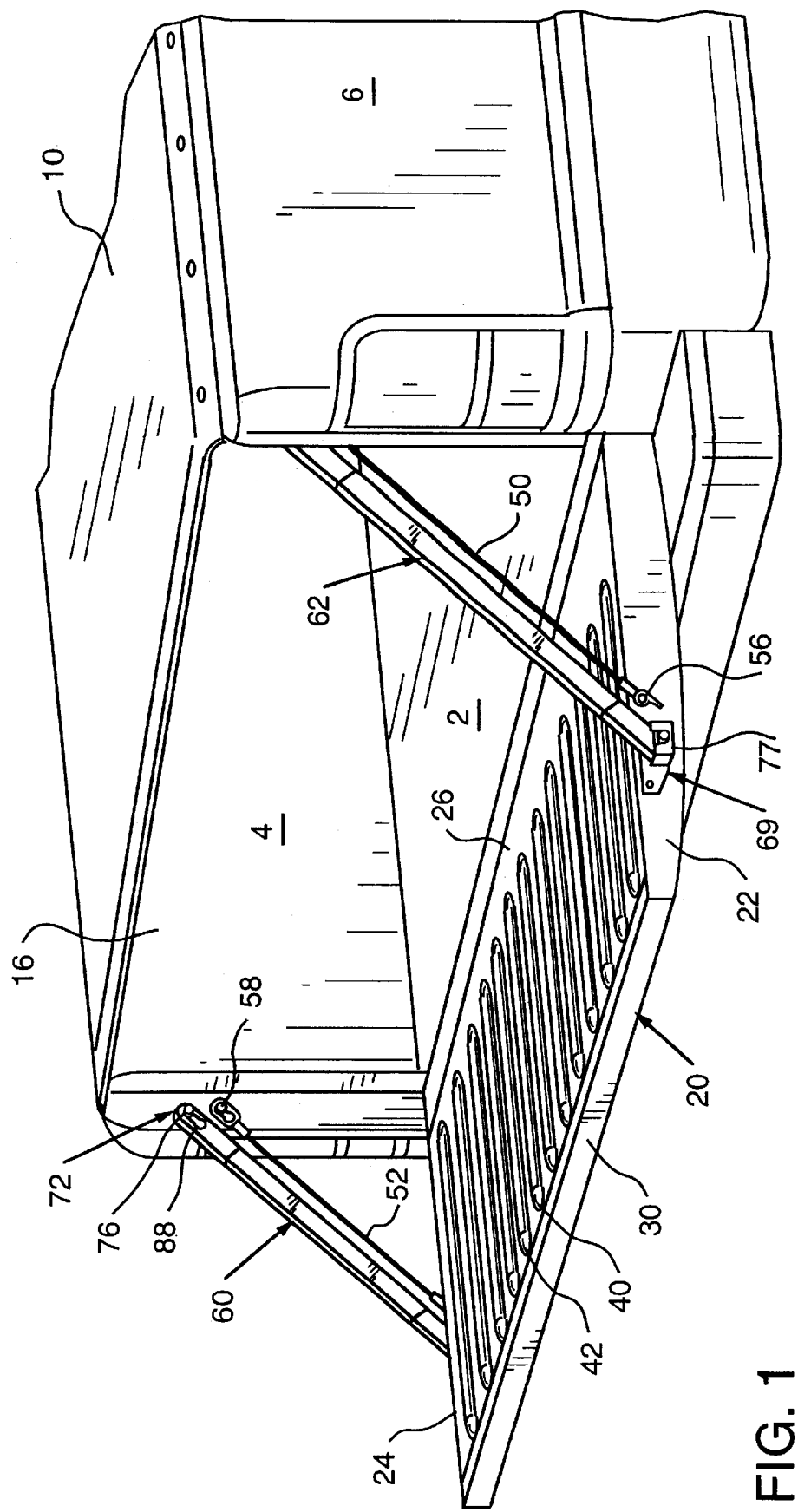
FIG. 1 is a perspective view showing a rear portion of a vehicle with the supplementary support members of the present invention secured to the vehicle and tailgate.

Referring now in greater detail to FIG. 1 there is shown a rear portion of a pickup truck which has a truck bed 2, a pair of upstanding generally vertical side body portions 4, 6 projecting upwardly therefrom and, in the form shown, a snap-on cover 10. An interior space 16 is provided. The truck has a unitary tailgate 20, which has a first end 22, a second end 24, an inner portion 26 which is hingedly connected to the truck bed 2 and an outer portion 30. In operation, the tailgate 20, which is shown in the open position, may rotate about a horizontal axis so as to assume a vertical position closing the interior space 16 with the ends 22, 26 being received within the opening defined by body portions 4, 6, bed 2, and cover 10. A plurality of reinforcing ribs such as 40, 42, extend generally perpendicular to elongated inner portion 26 and outer portion 30 and serve to reinforce the tailgate 20.

As is typical, the vehicle has a pair of first support members 50, 52 which may take the form of flexible steel cables, with a protective covering, for example. Each cable is permanently secured to the vehicle by a pair of rivets, such as 56 which secures the lower end of the first support member 50, which may be a cable to end 22 of tailgate 20 and rivet 102 which secures the lower end of first support member 52, which may be a cable to body portion 4. Each cable is designed to support the tailgate 20 and bear normal loads on the open tailgate. When unusually heavy articles are placed on the tailgate 20 as in loading and unloading the vehicle, alone or in combination with the weight of individuals, the load on the tailgate 20 in its illustrated open position, may exceed the cumulative strength of cables 50, 52. The cables 50, 52 may yield or fracture thereby damaging the vehicle and perhaps creating a risk to the individuals as well as cargo.

The present invention provides a pair of removable supplemental support members 60, 62, which are preferably rigid and of high strength. They may advantageously be made of a metal such as a suitable steel. The supplementary support members 60, 62 are structured to be engaged with the latch members which secure the tailgate 20 in its closed or upper position.

Figure 2:
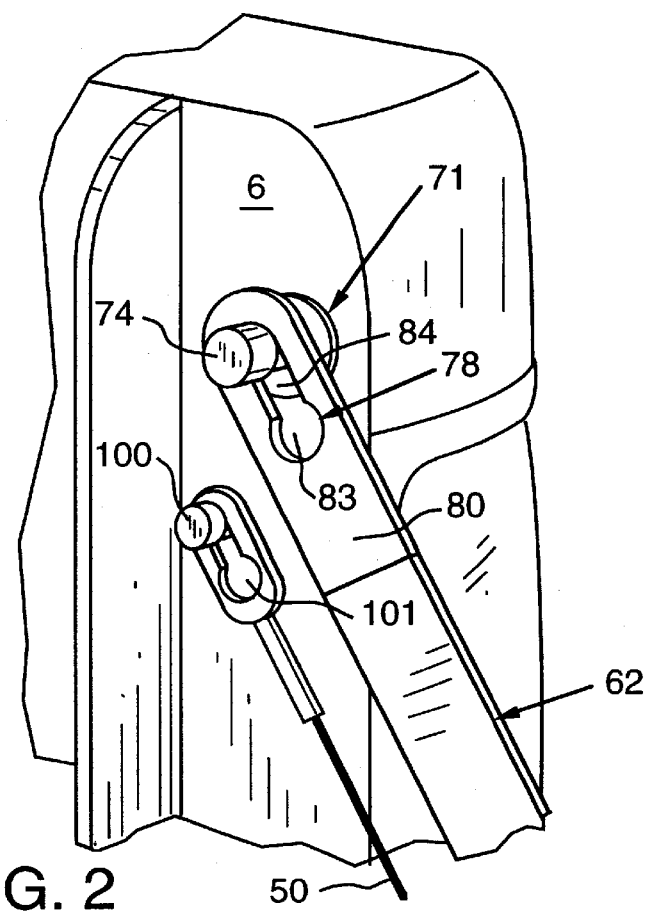
FIG. 2 is a fragmentary illustration showing securement of the upper portion of a supplementary support member of the present invention to the vehicle body.
Figure 3:
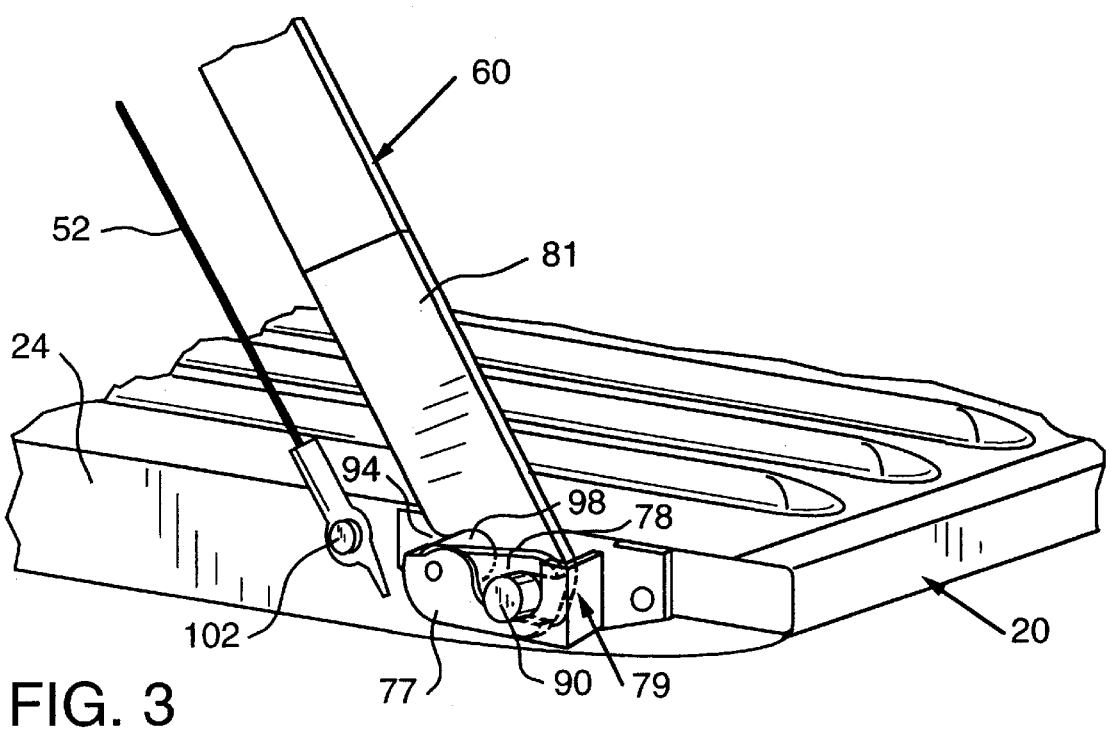
FIG. 3 is a partial view showing securement of an end portion of the supplementary support member of the present invention to the tailgate.
Figure 4:
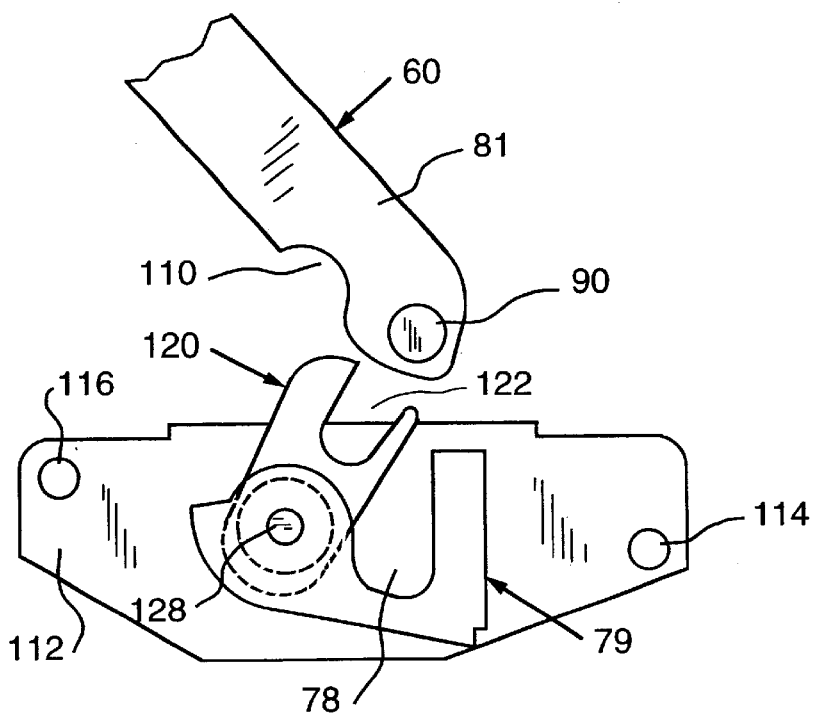
FIG. 4 is an elevational view showing a lower end of a supplementary support member of the present invention in a position spaced above the lower latching element which is secured to the tailgate.
Figure 5:
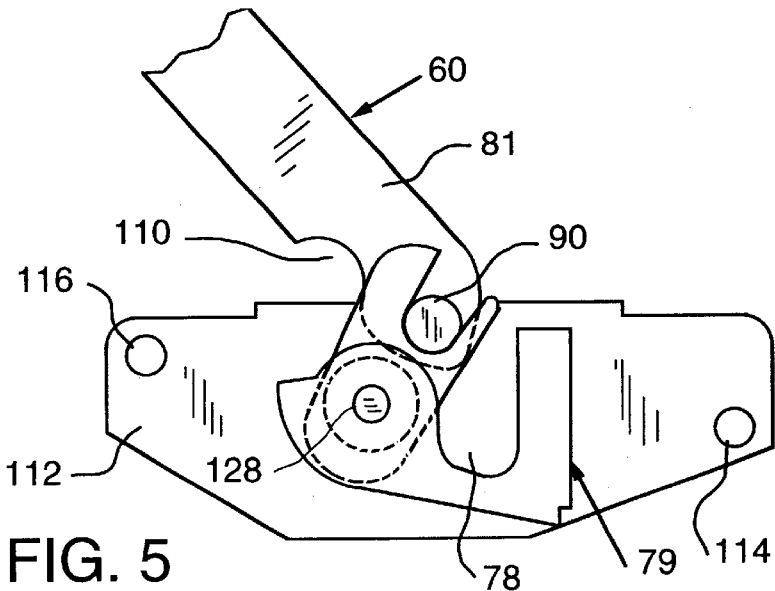
FIG. 5 is an elevational view similar to FIG. 4 but shows the supplementary support member engaged with a portion of the lower latching member.
Figure 6:
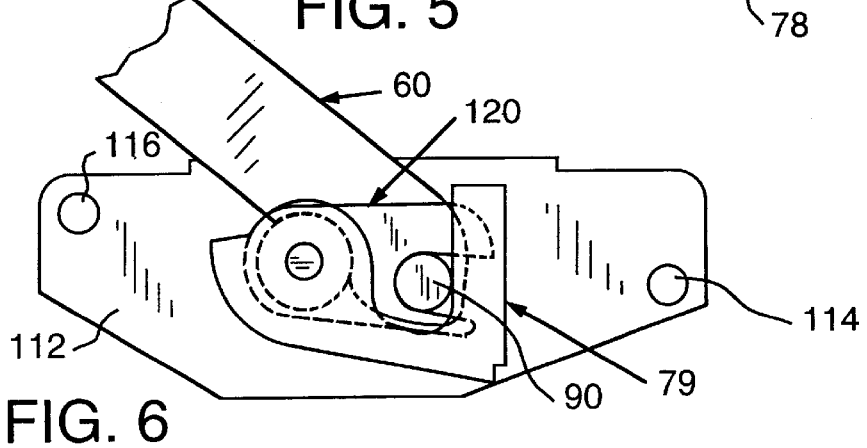
FIG. 6 is an elevational view similar to FIG. 5 but shows the lower end of the supplementary support member in locked position.

Referring to FIGS. 1 through 3, the vehicle has a pair of upper latch elements 71, 72 which, in the form shown, have a latch pin 74 and a corresponding latch pin member 76 secured respectively to body portion 6, 4 and projecting generally inwardly. The cooperating lower latching elements 69, 79 which are adjacent to first support members 50, 52, as shown in FIGS. 1 and 3, is secured to the ends of the tailgate 20 and has an element 77 which defines an upwardly open slot 78. As shown in FIGS. 1 and 2, the upper end portion 80 of supplementary support member 62 has an elongated opening 78 with an enlarged generally circular lower portion 83 and a narrower connected opening 84. Opening 84 is preferably tapered toward its free end to provide for a more intimate fit. In securing supplementary support member 62 to latching element 71, latch pin 74 has its enlarged head passed through circular lower portion 83 with relative movement being created to secure the reduced diameter shank of latch pin 74 within connected opening 84. The same is true with corresponding supplementary support member 60 and latch pin 76 with opening 88. Referring to FIG. 3 and the lower portion of supplementary support member 60, a projecting pin 90 is received within recess 78 of latch element 79. Any load applied on horizontally positioned or open tailgate 20 will be transmitted to the vehicle body through support members 50, 52 and supplementary support members 60, 62.

In securing the supplementary support member 60, 62 to the vehicle the tailgate 20 is placed in a partially or totally open position. Then lower pin, such as 90, is introduced into the recess, such as 78 and secured therein in the matter described herein. Then latch pin, such as 74, introduced into openings, such as 83, and through relative sliding movement entering opening portion 84. The tailgate 20 may then be lowered to its open or horizontal position. The same procedure is followed with both latching elements. If desired, while not preferred, the upper end of the supplementary support member may be secured first and then the lower portions may be secured.

It will be appreciated that the supplementary support members 60, 62 take advantage of the preexisting complementary and coacting latch elements and, therefore, does not require modification to the vehicle to install or remove the supplementary support members 60, 62. The process is merely reversed for removal of the same for storage when not in use.

Referring once again to FIGS. 2 and 3, it will be seen that the cable 50 at its upper end is secured to truck body by pin 100 which is received in keyhole shaped opening 101. Cable 52 is secured to the tailgate 20 by pin 102. It will be appreciated that in lieu of rivets 58, 100 or pins 56, 102, other suitable mechanical fasteners may be employed by the vehicle manufacturer in providing these first support members 50, 52.

Referring again to FIGS. 2 and 3 in a preferred embodiment of the invention, the supplementary support members 60, 62 may have any sort of protective coating secured thereto such as a paint or resinous plastic coating. It is preferred, that at minimum in portions 80, 81 will be provided with a protective resinous plastic or rubber coating so as to resist corrosion and damage to the supplementary support members during securement of the members to the latching members, removal of the same therefrom and storage.

Referring to FIGS. 3–8 details regarding the preferred sequence of operation in securing the lower portion of the supplementary support member of the present invention to the lower latching element will be considered. The lower portion of supplementary support member 60 has a pair of co-axial pins such as 90 projecting in opposite directions from an end portion. Adjacent to the pin, in the form shown is a generally concave recess 110. The lower latch member 79 has a base plate 112 provided with a pair of openings 114, 116 which through mechanical fasteners would secure the lower latching element 79 to end 24 of the tailgate 20. The other lower latching member 70 would be secured to the other end 22 of the tailgate in a similar manner. A rotatable keeper member 120 has a generally angularly upwardly open elongated recess 122 and is pivotally secured so as to rotate about core member 128. In the form shown in FIG. 5, pin 90 has been introduced into recess 122. Through continued movement and rotation of keeper member 120 in a clockwise direction, the pin is captured within recess 122 and recess 78. Conventional latch mechanisms which typically are connected by a rod extending across the interior of the tailgate extend from each lower latch element to a rotatable exteriorly positioned operating lever (not shown) which would be on the undersurface of the tailgate as shown in FIG. 3 in the tailgate open position. This serves to resist counterclockwise movement of the keeper element 120 thereby retaining the supplementary latch mechanism in a closed position. When it is desired to remove the supplementary support member 60, the operating lever is rotated so as to permit counterclockwise rotation of the keeper 120 to reverse the sequence shown in FIGS. 4, 5, and 6.

Figure 7:
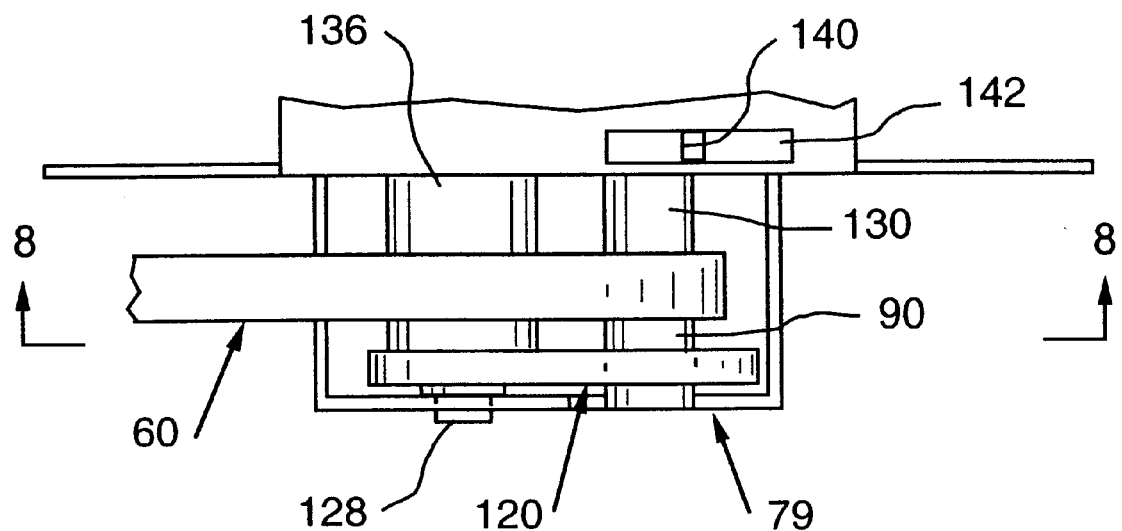
FIG. 7 is a top plan view showing the lower end of the supplementary support member and the associate latching member.
Figure 8:
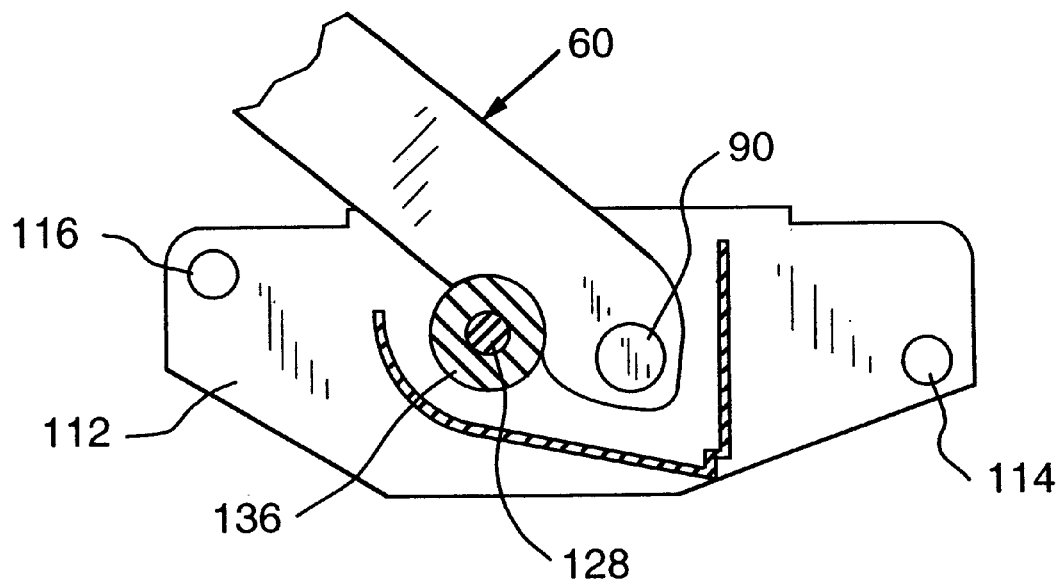
FIG. 8 is a cross sectional illustration of the latching member and lower end of the supplementary support member taken through 8—8 of FIG. 7.

FIG. 7 shows a plan view of the supplementary support member having pins 90, 130 projecting generally co-axially in opposite directions from lower support member 60. In this position, the recess 110 is in supported complementary surface to surface engagement with cylindrical member 136.

As shown in FIG. 7, an indicator element 140 is in position to reciprocate within slot 142 to indicate the locked or unlocked status of cylindrical member 136 which is fixedly secured to keeper member 120. By providing a pair of projecting pins 90, 130, a single design of supplementary support member 60, 62 may be employed for each side of the tailgate.

The pins 90, 130 should project outwardly sufficiently far as to maintain the desired locking engagement and should be of sufficient diameter as to assume a mechanical interengagement with recess 78 and keeper 120.

The supplementary support members 60, 62 should have an overall length and have the latch element engaging means so dimensioned as to fit the vehicle in intimate removable locking relationship with the tailgate in generally horizontal position.

Figure 9:
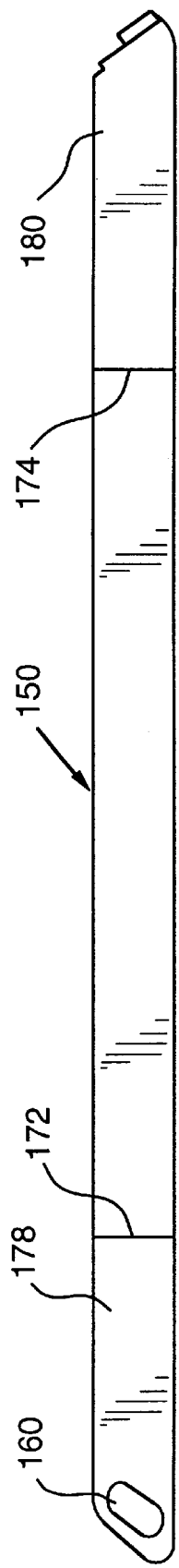
FIG. 9 is a front elevational view of a preferred form of supplementary support member of the present invention.
Figure 10:
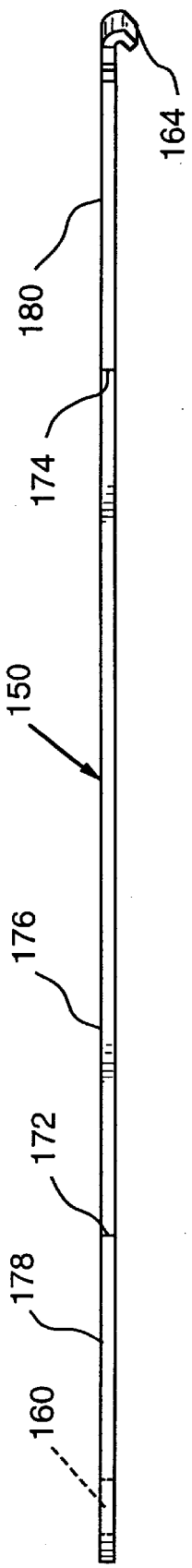
FIG. 10 is a top plan view of the support of FIG. 9.
Figure 11:
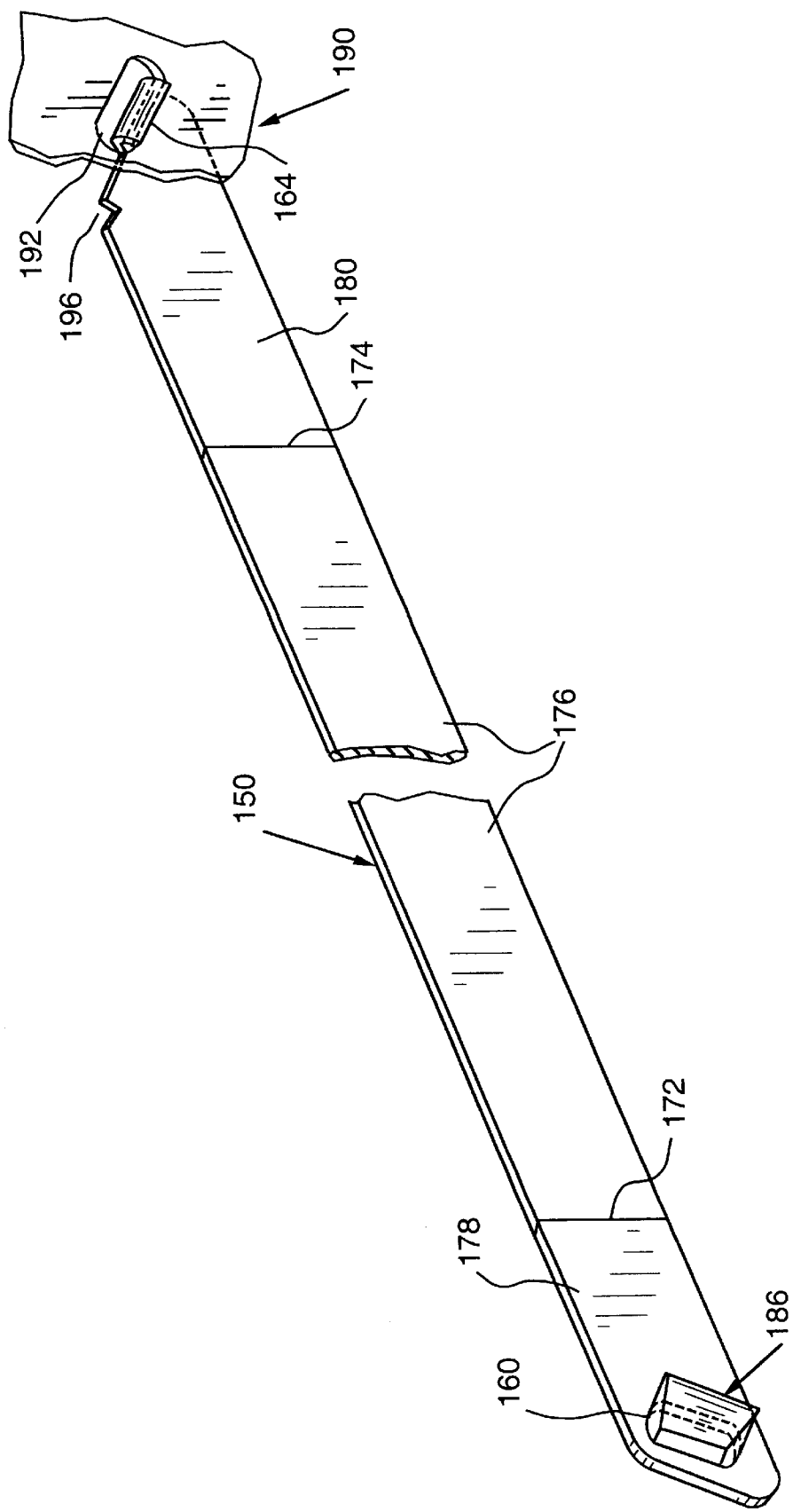
FIG. 11 is a perspective view of the form of supplementary support member of FIGS. 9 and 10.

FIGS. 9–11 illustrate a modified embodiment of supplementary support member 150 wherein the member has substantially uniform thickness throughout its length accept for the elongated opening 160 which is shown of being of generally rectangular with curved ends and the hook 164 at the other end.

In order to provide further details regarding the invention, an example will be considered. The supplementary support member may be made out of flat steel stock having a thickness of ¼ inch and a length of about 24 inches. In the form shown in FIG. 7, the pins 90, 130 may be ½ inch in diameter and the elongated keyhole like opening 78 may have an overall length of about 1½ inches with portion 83 being generally circular with a ¾ inch diameter and the width of tapered portion 84 averaging about ½ inch.

Lines 172, 174 divide central portion 176 from protectively coated end portions 178, 180.

If desired, the protective coating may be provided on the entire supplementary support elements 60, 62, 150.

Referring to FIG. 11, it is seen that a separate spring biased latching member 186 passes through opening 178 so as to provide for retention of that end of supplementary support member 150, which end could be the upper and lower but generally would be the lower end. At the other end, hook 164 passes through a support body portion 190 which has an elongated slot 192 and retains that end of the supplementary support member 150 in place. A recess 196 is provided adjacent thereto to facilitate additional engagement with another body portion or anchoring member.

Figure 12:
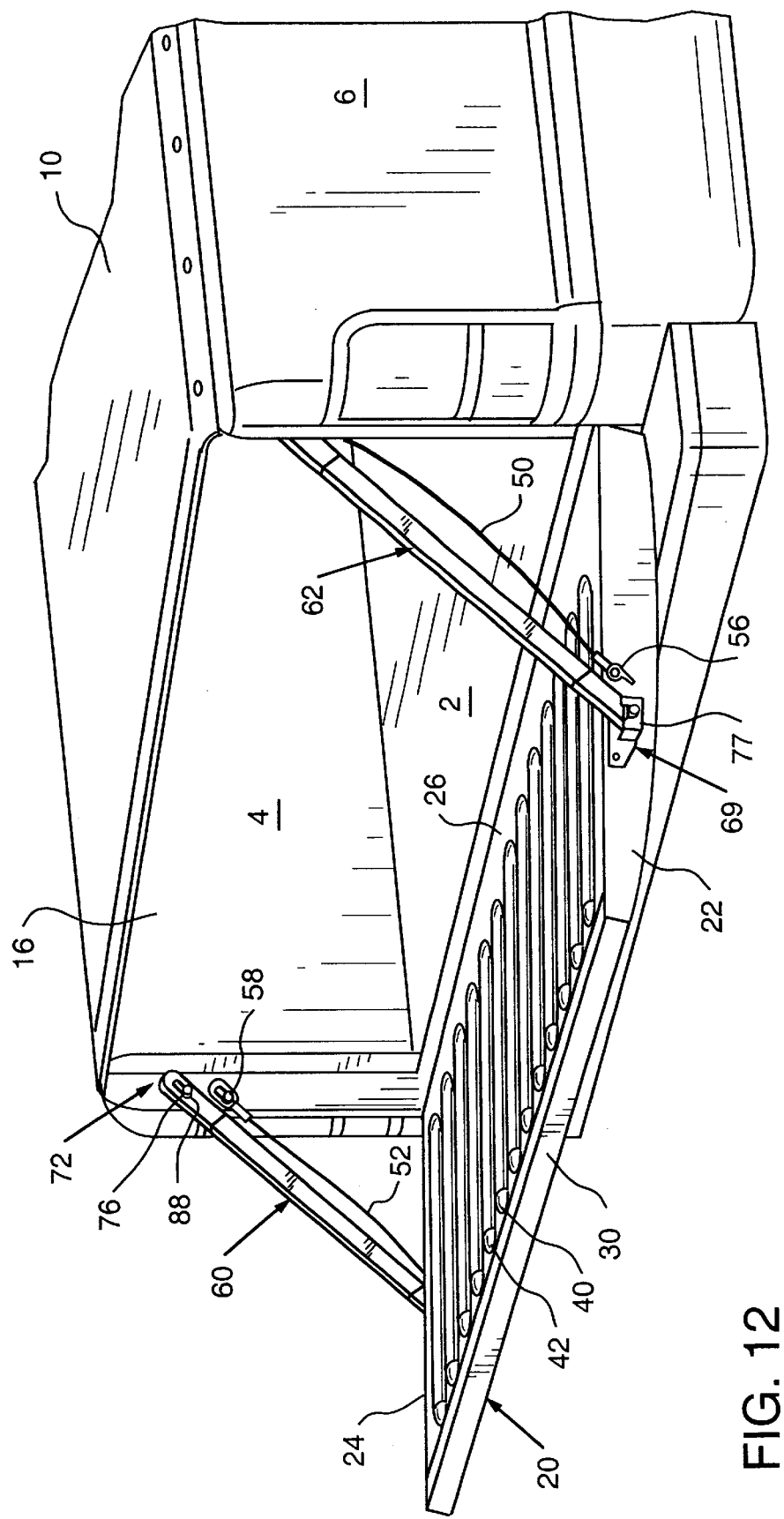
FIG. 12 is a perspective view showing a rear portion of a vehicle generally similar to FIG. 1, in a partially open position.

FIG. 12 shows the tailgate 20 in a partially open position such as would be the case in securing or removing the supplementary support members 60, 62.

While for simplicity of disclosure, reference has been made herein to securement of first latching elements to the vehicle body. It will be appreciated that such securement may be directly or indirectly to the vehicle body. The same direct or indirect securement of the second latch elements to the tailgate is contemplated by the present invention.

The present invention provides an efficient means for providing removable supplementary support to a tailgate in a fashion which does not require any permanent alteration to the vehicle. All of this is accomplished by providing a suitably structured support member which has end portions adapted to be removeably secured to the preexisting latch elements of the vehicle. It will also be appreciated that this additional support is provided at the ends of the tailgate and, therefore, does not obstruct the opened area which is provided when the tailgate is in the lower position.

It will be appreciated that while certain specifically preferred structural elements which accommodate the latch elements of the vehicle has been shown, depending upon the nature of the latch elements on a particular vehicle, modified means for engagement of the latching elements may be provided on the supplementary support member so as to provide for effective removable interengagement between the end portions of the supplementary support member and the two latching elements. Such modifications will be readily known to those skilled in the art.

Whereas particular embodiments of the present invention have been described herein for purposes of illustration, it will be appreciated by those skilled in the art that numerous variations of the details may be made without departing from the invention as described in the appended claims.

What is claimed is:

1. A vehicle comprising
   a vehicle body,
   a reinforced unitary tailgate secured to said vehicle body for rotation with respect thereto about a generally horizontal axis,
   said tailgate structured to rotate between a closed up position and a generally horizontal open position,
   a pair of relatively spaced first support members secured to said vehicle body and said tailgate for supporting said tailgate in said open position,
   two pairs of latches each having one first latch element secured to said vehicle body and a cooperating second latch element secured to said tailgate, whereby said first and second latch elements will engage each other to secure said tailgate in said closed up position,
   a pair of removable elongated supplementary support members each having a first portion removably secured to said first latch element and a second portion removably secured to said second latch element,
   said second latch elements being secured to said tailgate adjacent to said first support members,
   said supplementary support members being substantially rigid, said first latch elements each having a latch pin projecting generally toward each other, each said supplementary support member having an opening through which said latch pin passes, said second latch elements having a recess formed therein, each said supplementary support member having a projecting pin passing through said recess, and each said supplementary support member having a recess adjacent to said projecting pins.

2. The vehicle of claim 1 including said tailgate having a pair of elongated sides about one of which said tailgate rotates and a pair of ends, and said second latch elements projecting outwardly from the ends of the tailgate.

3. The vehicle of claim 2 including said first latch elements projecting generally toward each other.

4. The vehicle of claim 3 including said supplementary support members being made of metal.

5. The vehicle of claim 4 including each said supplementary support member having a pair of relatively spaced end portions, and a resinous plastic layer on said end portions of said supplementary support members.

6. The vehicle of claim 1 including said first support members being flexible cables.

7. The vehicle of claim 1 said projecting pins projecting from each side of said supplementary support members, whereby said supplementary support members can be removably secured to either end of said tailgate.

8. A vehicle comprising a vehicle body, a reinforced unitary tailgate secured to said vehicle body for rotation with respect thereto about a generally horizontal axis, said tailgate structured to rotate between a closed up position and a generally horizontal open position, a pair of relatively spaced first support members secured to said vehicle body and said tailgate for supporting said tailgate in said open position, two pairs of latches each having one first latch element secured to said vehicle body and a cooperating second latch element secured to said tailgate, whereby said first and second latch elements will engage each other to secure said tailgate in said closed up position, a pair of removable elongated supplementary support members each having a first portion removably secured to said first latch element and a second portion removably secured to said second latch element, said second latch elements being secured to said tailgate adjacent to said first support members, said supplementary support members being substantially rigid, said first latch elements each having a latch pin projecting generally toward each other, each said supplementary support member having an opening through which said latch pin passes, said second latch elements having a recess formed therein, each said supplementary support member having a projecting pin passing through said recess, and each said opening in said supplementary support member having an enlarged portion and an adjacent portion of reduced size.

9. A vehicle comprising a vehicle body a reinforced unitary tailgate secured to said vehicle body for rotation with respect thereto about a generally horizontal axis, said tailgate structured to rotate between a closed up position and a generally horizontal open position, a pair of relatively spaced first support members secured to said vehicle body and said tailgate for supporting said tailgate in said open position, two pairs of latches each having one first latch element secured to said vehicle body and a cooperating second latch element secured to said tailgate, whereby said first and second latch elements will engage each other to secure said tailgate in said closed up position, a pair of removable elongated supplementary support members each having a first portion removably secured to said first latch element and a second portion removably secured to said second latch element, said second latch elements being secured to said tailgate adjacent to said first support members, said supplementary tailgate supports being substantially rigid, each said supplementary support member having a latch engaging opening adjacent to one end thereof and a hook member at the other end thereof, each said supplementary support member being of generally uniform thickness throughout its length except for said opening and said hook member, and said opening receiving a spring-biased latching element.

10. A vehicle comprising a vehicle body, a reinforced unitary tailgate secured to said vehicle body for rotation with respect thereto about a generally horizontal axis, said tailgate structured to rotate between a closed up position and a generally horizontal open position, a pair of relatively spaced first support members secured to said vehicle body and said tailgate for supporting said tailgate in said open position, two pairs of latches each having one first latch element secured to said vehicle body and a cooperating second latch element secured to said tailgate, whereby said first and second latch elements will engage each other to secure said tailgate in said closed up position, a pair of removable elongated supplementary support members each having a first portion removably secured to said first latch element and a second portion removably secured to said second latch element, said second latch elements being secured to said tailgate adjacent to said first support members, said supplementary support members being substantially rigid, said first latch elements each having a latch pin projecting toward each other, each said supplementary support member having an opening through which said latch pin passes, said second latch elements having a recess formed therein, each said supplementary support member having a projecting pin passing through said recess, and each said second latch elements having a rotatable keeper member with a recess for receiving said projecting pin.

11. A method of reinforcing a unitary vehicle tailgate which is rotatably secured to a vehicle body comprising providing a vehicle having the reinforced unitary tailgate which is rotatably secured thereto between a closed up generally vertical position and an open generally horizontal position with a pair of first support members connecting said tailgate to the vehicle body so as to support the tailgate in said open generally horizontal position, said tailgate being structured to assume partially open positions between said closed up generally vertical position and open generally horizontal positions, providing a pair of supplementary support members which are elongated and substantially rigid and, are structured to have end portions removably secured to first latch elements secured to the vehicle body and second latch elements secured to said tailgate adjacent to said first support members, moving said tailgate to one of said partially open positions, securing a first end portion of each of said supplementary support members to the first latch elements, securing a second end portion of each of said supplementary support members to the second latch elements, whereby said tailgate will be in said open generally horizontal position with support being provided by both said first support members and said supplementary support members, reversing the sequence of steps employed to secure said supplementary support members, employing as said supplementary support members elongated substantially rigid metal members, providing in each of said supplementary support members in said first end portion elongated openings for engaging of said first latch elements projecting inwardly, and providing on the second end portion of said supplementary support members at least one pin member structured to be received within a recess within said second latch elements.

12. The method of claim 11 including providing on said supplementary support members generally coaxial pins projecting in opposite directions from the second end portion thereof which will engage said second latch elements.

13. A method of reinforcing a unitary vehicle tailgate which is rotatably secured to a vehicle body comprising providing a vehicle having the reinforced unitary tailgate which is rotatably secured thereto between a closed up generally vertical position and an open generally horizontal position with a pair of first support members connecting said tailgate to the vehicle body so as to support the tailgate in said open generally horizontal position, said tailgate being structured to assume partially open positions between said closed up generally vertical position and open generally horizontal positions, providing a pair of supplementary support members which are elongated and substantially rigid and, are structured to have end portions removably secured to first latch elements secured to the vehicle body and second latch elements secured to said tailgate adjacent to said first support members, moving said tailgate to one of said partially open positions, securing a first end portion of each of said supplementary support members to the first latch elements, securing a second end portion of each of said supplementary support members to the second latch elements, whereby said tailgate will be in said open generally horizontal position with support being provided by both said first support members and said supplementary support members, and securing said supplementary support members to said tailgate before securing said supplementary support member to said vehicle body.

14. A vehicle tailgate supporting member comprising an elongated substantially rigid vehicle tailgate supporting member body having a first vehicle latch engaging portion for engaging a first latch element at one end portion thereof and a second latch engaging portion for engaging a second latch element at the other end portion thereof, said tailgate supporting member being of such length as to maintain a vehicle tailgate in generally horizontal position when said respective end portions are in engagement with said vehicle latch elements, said vehicle tailgate supporting member having an elongated opening at one end portion as said first latch engaging portion and having a pair of generally coaxial pins projecting from said other end portion as said second latch engaging portion.

15. The vehicle of claim 14 including said vehicle tailgate supporting member being made of steel.

16. The vehicle of claim 15 including said end portions of said vehicle tailgate supporting member being protectively coated with a resinous plastic material.

* * * * *

UNITED STATES PATENT AND TRADEMARK OFFICE
CERTIFICATE OF CORRECTION

PATENT NO.   : 6,279,979 B1
DATED        : August 28, 2001
INVENTOR(S)  : Glenn Cauley It is certified that error appears in the above-identified patent and that said Letters Patent is hereby corrected as shown below:

Column 1,
Line 50, "which" should be deleted.

Column 2,
Line 10, "thither" should be -- the other --.

Column 4,
Line 47, "rivets 58" should be -- pins 58 --.
Line 47, "pins 56" should be -- rivets 56 --.

Signed and Sealed this

Sixteenth Day of April, 2002

Attest:

Attesting Officer

JAMES E. ROGAN
*Director of the United States Patent and Trademark Office*